Nov. 5, 1963

R. P. ROBICHAUX

3,109,740

BUTTER CHURNING APPARATUS AND METHOD

Original Filed Aug. 18, 1959

INVENTOR.

Roy P. Robichaux

BY Norman E. H. Heletzke

Atty.

United States Patent Office 3,109,740
Patented Nov. 5, 1963

3,109,740
BUTTER CHURNING APPARATUS AND
METHOD
Roy P. Robichaux, Monroe, Wis., assignor to Lakeville
Creameries, Inc., Lakeville, Minn., a corporation of
Minnesota
Original application Aug. 18, 1959, Ser. No. 834,583.
Divided and this application July 5, 1962, Ser. No.
208,681
40 Claims. (Cl. 99—119)

This invention pertains to improvements in method and apparatus and system for making butter from milk or cream by continuous and automatic operation and by batch operation. This invention also pertains to improvements in the physical and chemical characteristics of butter.

This invention also pertains to improvements in apparatus and method for the continuous and automatic standardization or adjustment of flowable materials to secure desired conditions as to variable characteristics of the materials and to the conversion of the flowable materials to produce one or more end products having predetermined values with respect to the mentioned variable characteristics.

More particularly stated, one aspect of this invention relates to improvements in the method and apparatus and system for treating butter granules churned from the milk fat in milk or cream, whereby to incorporate into the butter much greater than normal proportions of milk solids by an improved method which appears to use the butter flakes or granules to extract such additional milk solids from the buttermilk produced in the churning of the butter, and whereby to process the butter without the use of water, and whereby to more exhaustively churn the milk fat from the milk or cream, to produce an improved butter product having a greater than normal percentage of milk solids and serums and a lower than normal moisture content and improved characteristics as to body, texture, spreadability, flavor and keeping qualities.

Another aspect of this invention, stated more particularly, relates to improvements in a continuously and automatically operable system and method for treating a flowing stream of material of variable pH value, continuously testing the material and standardizing or adjusting such variable pH value to a predetermined and substantially fixed pH value and promptly after such adjustment continuously converting all or parts of the thus tested and adjusted material into products of predetermined characteristics, such as pH value, while the pH value of the adjusted material remains substantially constant and before such factors, as for example, bacterial action, can cause any undesirable variations in the pH value of the adjusted material.

One aspect of this invention has particular relation to improvements in a system of apparatus and method especially useful in the treatment of materials such as, for example, sour milk and sour cream containing acid forming bacteria and having variable pH values to reduce to a minimum the growth of bacteria and to adjust and control to predetermined values the hydrogen ion concentration or pH value of such milk or cream and the pH of the finished products, such as butter made therefrom. Such control in the finished product is in part achieved by the prompt conversion of such adjusted materials into the desired end product or products immediately after adjustment to correct pH values and before the pH value of the material as adjusted can appreciably vary from the adjusted standard and before the bacteria can multiply appreciably. A variation of the pH value as adjusted could result if the bacterial action were permitted to continue or recommence in the product before the adjusted product is converted into the final end product.

This application is a division of my copending and allowed application Serial No. 834,583, filed August 18, 1959, and entitled "Butter Churning Method and Apparatus" and claims the subject matter as claimed in said application Serial No. 834,583, and also discloses and claims the subject matter claimed in my copending application Serial No. 861,553, filed December 23, 1959, as a division of said application Serial No. 834,583 and entitled "Butter Churning Apparatus," both now abandoned. This application is also a continuation in part of my copending application Serial No. 740,720, filed June 9, 1958 now Patent No. 3,069,996, granted December 25, 1962, and entitled "Churning Apparatus and Method." The aspect of this invention pertaining to the improved butter product has been described and claimed in my copending application Serial No. 861,554, filed December 23, 1959, and entitled "Butter and Method of Churning." Said application Serial No. 861,554 was also filed as a division of said application Serial No. 834,583.

Milk, being a highly complex biological product, including, among other things, serums and solids and fats, and being highly perishable, due, among other reasons, to the development of acid conditions as a result of bacterial actions, is extremely sensitive to many types of treatment, for example, heat treatment, agitation, and chemical reactions. The acid content of the milk product has a pronounced bearing upon the extent to which and the manner in which the product must be treated to enable the extraction of the milk solids and/or the extraction of milk fat from the milk or cream and the manner in which such solids and/or fats react in subsequent treatments, as for example churning in the manufacture of end products, such as butter or dried milk products, and upon the chemical and physical characteristics of such end products. It should of course be understood that in the processing of dairy products, as well as in the processing of other products, by the use of this invention, it may be desirable to adjust the pH value of the material being processed by the addition of an alkaline adjusting material or an acid adjusting material as the case may be, depending upon the condition of the material and the end result to be obtained. This invention is equally well adaptable for use in either such type of alkaline or acid adjustment.

Bacterial action in sour milk or sour cream and the resulting development of acidity, under normal temperatures, continues at a high rate until the acidity has increased to such an extent that the bacterial activity and the multiplication of bacteria decreases or terminates. Thereafter, upon the neutralization of the acid condition in such sour milk or sour cream by the addition of neutralization material to secure a pH value of approximately 7, the acid producing activity and multiplication of the bacteria again commences or increases in a reasonably short time with the resulting large increase in bacteria count in the milk or cream and the re-acidification of the milk or cream. After a lapse of appropriate period of time further adjustment of the acid condition is again required to adjust the pH value of the milk or cream to the desired pH value close to the neutral point or a pH value of approximately 7 preferred for the satisfactory separation, churning and drying of the portions of the material. Obviously, such repeated adjustment of the acid condition in the sour milk or cream and the resulting increase or multiplication of bacteria in the milk or cream and the resulting increase in such material of the by-product of neutralization of the acid condition, introduces various serious difficulties in the production of end products having low bacterial count and desirably low percentages of the by-products of the chemical reaction which of necessity takes place upon the adjustment of the acid condition in the milk or cream.

There are various tests commonly used in the testing of such products as sour milk or sour cream to enable the proper adjustment of the acid condition therein. This invention is concerned in part with one such test in one step of the improved pH adjustment process. It is therefore desired to point out that there is an important difference between pH and titratable acidity or alkalinity. pH is a measure of the intensity of the acid or alkali, whereas titratable acidity or alkalinity is a measure of the amount of acid or alkali present. In order to obtain a comprehensive view of the properties of a solution both systems could be used for the reason that different acids or alkalies have different activities when present in equal amounts.

However, in the present method for the continuous processing of material, including the continuous adjustment of the acid or alkali content of such material, a given pH value is sought in the pH adjustment step, rather than a titratable amount of acidity or alkalinity, as being the more valuable with respect to final result in the end product, is the desired objective.

The control of the pH value of a material, such as milk or cream, is a most important step in the standardization and improvement of such products and the end products such as butter to be made therefrom. For example, it is most important to control the pH value of the serum in butter at a pH of 6.9 to 7.1 for butter which is to be successfully stored for any period of time. A pH of 6.5 to 7.0 is satisfactory for butter which is not to be stored. Such control of the pH value produces a combination of ideal flavor and keeping quality in the finished butter. The similar type of accurate control of the pH value of the skim milk or buttermilk which is to be dried enables the efficient operation of the drying machines and the production of a dried product having good flavor, good solubility and good keeping qualities. By the use of the present invention such control may be achieved with the use of the minimum quantity of pH adjustment media and at the same time achieve and maintain a very low bacteria count in the material and end product.

The present accepted commercial method of producing large quantities of butter from cream involves the utilization of a supply of cream containing generally from thirty to forty percent milk fat. If such cream is sour the pH thereof is usually adjusted until the excess acidity thereof has been reduced to a substantially neutral condition. The cream to be churned is normally ripened and pasteurized. The butter is usually a standardized product produced by the addition to the cream or butter, as the case may be, of coloring and flavoring extracts, starter materials, water, and salt, if a salt butter is desired.

The production of butter is an ancient art. Today it comprises the basis of a very large and very highly competitive industry. The buying and selling of butter is based to a large extent on such characteristics of the butter as appearance, flavor, uniformity, body, texture, and spreadability, presupposing of course, that all such minimum requirements as relate to minimum fat content and maximum water content, etc., as are usually regulated by law or by governmental agencies, have been met. In the batch churning of butter, the cream, which is to be churned, is usually ripened, pasteurized and cooled to a churning temperature of approximately forty-five to forty-eight degrees Fahrenheit. After a period of churning, which may last for approximately forty-five minutes, the milk fat globules in the cream are coalesced to form butter flakes. During the churning operation the temperature of the cream rises to a butter "breaking" temperature of approximately fifty-five degrees Fahrenheit. The rise in temperature apparently results from the working of the cream in the churn and the heat generated by the crystallization of the milk fat as the milk fat globules are converted into butter flakes. After the formation of the butter flakes, the buttermilk is drained from the mass of butter flakes and the mass of butter flakes washed with cold water to reduce the temperature of the butter flakes or granules from a temperature of approximately fifty-five degrees Fahrenheit to a more suitable working temperature of approximately forty-five to forty-eight degrees Fahrenheit. Some of the wash water is incorporated into the butter by a butter working operation. At the elevated temperature of approximately fifty-five degrees Fahrenheit, butter may be worked but at that temperature butter is easily overworked and if overworked the texture there is severly damaged and the finished butter will be characterized by a "salvy" and "smeary" texture, and will, of course, be a very much depreciated product, commercially. The flavor and spreadability characteristics and other factors which greatly influence the economics of the business of manufacturing butter require that a certain amount of moisture be incorporated in the butter. Incorporation of moisture into butter at too high a temperature, such as the "breaking" temperature is impractical for the reason that incorporating uniformly distributed and minute quantities of moisture into the butter at such elevated temperature requires much more working of the butter than the butter can stand at such temperature, with the resulting destruction of the texture characteristics of the butter. Making and selling butter with too great a butter fat content could not be justified economically in a highly competitive market.

It is also a well known fact that the flavor of the butter is derived from the milk serum and milk solids content of the butter and that conventional butter of high or choice quality has a milk solids content varying from one-half percent to one percent. It is also a well known fact that the milk solids content of the butter has a pronounced effect upon the spreadability of the butter, assuming of course that the butter is of maximum quality and has been made according to conventional methods of butter making by a highly skilled and well trained and experienced "buttermaker."

The applicant has observed that slight increases in the milk solids content of butter, which slight increases may result from the use in churning of cream which, due to its particular nature, happens to have a higher than normal milk solids content, produces a superior butter, with improved flavor and spreadability and texture characteristics. Such increases in milk solids content, when they do happen are slight and the increase in milk solids resulting in such instances does not raise the solids content of such butter above one percent.

It is of course common knowledge that the addition to butter of any ingredients, as for example specially prepared milk solids, etc. is prohibited. It is also well known that butter fat containing products to which such ingredients may have been added cannot be sold or identified as butter and that such products have body, texture and spreadability characteristics which are not similar to corresponding properties of butter.

It is well known in the creamery art that efficient and economical churning of cream in the manufacture of butter cannot be efficiently done at reduced temperatures at which butter may be safely worked, but that the churning must be done at such a temperature that the "breaking" temperature of approximately fifty-five degrees Fahrenheit is reached in a minimum of time. It is, however, also well known that at such "breaking" temperature some of the milk fat in the cream is in liquid state and cannot be converted into butter flakes or granules and is normally retained in the liquid state in the butter milk at such elevated or "breaking" temperature.

As was previously stated, it is appreciably more difficult to incorporate desired quantities of uniformly distributed and minute particles of moisture into butter at the elevated breaking temperature than it is to thus incorporate such moisture at reduced working temperatures, and if the moisture is incorporated into the butter at such elevated temperatures it is accomplished by the over working of the butter and the sacrifice of texture characteristics of the butter.

In the manufacture of butter, the conventional methods of batch and/or continuous operation do not include satisfactory provisions for the use of the normal by-products of butter manufacture, as for example, the skim milk and the buttermilk by-products. Similarly the separation of milk or thin cream to produce cream of desired milk fat concentration entails the storage of the skim milk if it is to be utilized in the subsequent manufacture of a product. Such storage of large quantities of skim milk or buttermilk necessitates the use of expensive equipment and, in the event the product is to be dried, requires the continued adjustment and control of the pH value of the material.

One aspect of the present invention provides, as one step thereof, a continuous and automatic system for the continuous addition, to the material, such as cream, being processed, of the pH adjustment media and the complete reaction and conversion of the pH adjustment media with the resultant prevention of local over-neutralization frequently experienced in the conventional batch methods of adjustment, which over-neutralization results in damage to the flavor and other desired characteristics of the end product. The elimination of the batch method of pH adjustment also eliminates the inconveniences and expenses of elaborate testing, computing acid numbers or percentages, etc. The use of the present invention includes the step of continuously and automatically adding the correct amount of pH adjustment media to the material being processed to secure the desired hydrogen ion concentration in the end product with a minimum of effort and a maximum of accuracy.

A unique advantage of one aspect of the present invention is the provision of a coordinated system and method wherein the pH value of the material, such as for example, sour milk or sour cream, is adjusted only once immediately before the final conversion of the material into the end products. The pH adjusted skim milk, secured from an incidental separation of the sour milk or the incidental concentration of the cream to a desired milk fat content, is immediately dried before the pH value thereof has an opportunity to vary appreciably from the adjusted value or before the acid forming bacteria again become active therein. The milk fat in the pH adjusted cream is promptly agglomerated or converted into butter flakes by mechanical agitation, and transferred together with buttermilk to one of a series of drum-type treating and working units wherein to treat the butter and to produce the desired body and texture in the butter. The buttermilk, upon completion of the butter treating operation and while yet properly adjusted as to its pH, is promptly re-separated to salvage any milk fat remaining therein. The separated fraction containing the milk fat is returned to the cream supply ahead of the churn for re-introduction into the churn and further churning. The separated buttermilk fraction is promptly dried without the necessity of further adjustment of the pH value thereof.

One of the primary objectives of this invention is therefore to provide a new, novel and useful method and method variations for the continuous and automatic and/or the batch operation for the conversion of a creamery or dairy product into butter, dried skim milk and dried buttermilk, each having uniformly and accurately adjusted and predetermined pH value, secured and maintained at a predetermined pH value by the use of a minimum of pH adjustment media, wherein the bacterial growth in the material being processed and the bacteria count in the finished products is reduced to a minimum, and wherein there is provided a new, novel and useful continuous and automatic and/or batch system, including interacting apparatus, for the manufacturing of butter with a minimum loss of milk fat and a greater than normal content in the butter of milk solids derived directly in their natural state and arrangement from the lacteal liquid and with the butter possessing recognized characteristics of exceptional high quality as to spreadability, keeping quality, flavor and texture, and for drying the by-products of such manufacture, for example, the skim milk and the buttermilk, with all the end products having the recognized characteristics of high quality.

A still further objective of this invention is to provide several variations of improved systems of interacting apparatus and improved method whereby to so treat the freshly churned butter, during the manufacture thereof, such as in the churning and working operations, as to make possible much more extensive working of the butter during its production without injury to the texture qualities thereof while simultaneously incorporating thereinto very appreciably increased quantities of milk solids, including lecithin, and increase quantities of milk serum, all derived directly and in their natural state and arrangement from the milk or cream from which the butter was produced and from the buttermilk which was formed during the butter churning operations, and without the conventional incorporation of moisture in the form of water.

It is a further objective of this invention to provide an improved butter product having a very appreciably higher milk solids and milk serum content than has heretofore been possible in freshly churned butter.

A still further object of this invention is to provide an improved and more exhaustive butter churning method, whereby to convert more of the milk fat content of the cream into butter.

Another objective of this invention is to provide new, novel and useful systems of apparatus for the cooling of buttermilk and the circulation of cooled buttermilk over and through the newly churned butter granules during the production of the butter.

The foregoing and other objectives, important novel and useful features and advantages of this invention will become more apparent and more easily understood upon examination of the following description thereof and the accompanying drawings and appended claims. It should, however, be remembered that, without desire of limitation, the invention will be described and illustrated as the preferred embodiments in apparatus and method for the manufacture of butter and dried milk and dried buttermilk. Certain changes and variations may suggest themselves to those skilled in the pertinent arts upon review of this application, which changes may not, however, depart from the spirit of this invention and may come within the scope of the appended claims.

Referring to the drawings, in which like elements are identified by like numerals, and referring in particular to FIGURE 1 of the drawings, and having in mind one of the preferred embodiments of the invention, which will be described for the purpose of example only with respect to the processing of sour milk or sour cream which is continuously supplied from the supply tank 10, having an attempering coil 11 and agitator 12, through pipe 13 and pump 14, to filter 15. From filter 15 the filtered milk or cream is circulated through pipe 16 and pump 17, which pump comprises part of the pH adjustment unit 18, hereinafter to be more fully described, and through pipe 19 to a heating unit 20. While the milk or cream is flowing through the pH adjustment device 18, the milk or cream is automatically and continuously sampled and tested as to its pH value or hydrogen ion concentration, and adjusted to a desired pH value by the uniform addition of the necessary quantity of a suitable pH adjustment medium. The heater 20 may, if desired, be of any of the conventional pressure type heaters, and should have sufficient capacity to properly and quickly attemper the stream of material, such as milk or cream, to a satisfactory separating temperature. The heater 20, may if desired, also comprise a pasteurizer of any of the well known types, and may be used to pasteurize the product being processed.

From the heat exchanger 20, the attempered product which has been satisfactorily adjusted as to pH value to assure the desired pH value in the end product and to assure satisfactory separating characteristics, flows through conduit 21 into a centrifugal separator 22.

Separator 22 separates the attempered and neutralized milk or cream into a fraction containing a relatively high milk fat content, preferably of the nature of thirty percent to forty percent, satisfactory for churning butter. The separation fraction containing the high milk fat content is discharged from separator 22 through conduit 23. The separation fraction containing primarily the skim milk, flows from separator 22 through conduit 24 to a skim milk drying arrangement, hereinafter to be more fully described.

From pipe 23 the high fat content cream flows into a surge tank 25 from which it is pumped by means of conduit 26 and pump 27 into and through an attempering device 28. The attempering device 28 may, if desired, consist of a plate type heat exchanger so constructed and arranged as to be adapted to quickly and continuously pasteurize and then cool the milk or cream supplied thereto to a satisfactory churning temperature. From the unit 28 the milk or cream flows continuously through pipe 29 into a surge tank 30 provided with an attempering coil 31 and agitator 32.

It should be remembered that in the event that the attempering unit 20 has been used to pasteurize the material being processed, then the unit 28 may need to be used only as a cooler if necessary, or may be eliminated entirely if the unit 30 has sufficient attempering capacity to attemper the cream to a satisfactory churning temperature. Similarly the milk or cream may be satisfactorily attempered for centrifugal separation in supply tank 10 in which instance the attempering unit 20 may be eliminated, and the necessary heating and/or cooling and/or pasteurizing done in the unit 28 or the units 28 and 30. At the unit 30 there is provided a dispensing unit 80 adapted to be used when desired to supply to the cream in vat 30 various additives as for example, flavor and/or starter ingredients in predetermined quantities to be incorporated in the butter.

The cream, ready for churning, and of a desired pH value and temperature, is conducted through pipe 33 from tank 30 to a mechanical agitator and atmospheric pressure type butter churn 34, hereinafter to be more fully described. In the churn 34 the cream is subjected to mechanical stresses such as violent agitation, whereby to break the normal emulsion of the cream and to convert the cream into butter flakes or granules formed from the milk fat globules in the cream and into butterfat.

The butter granules and buttermilk of predetermined pH are discharged continuously from churn 34 through shroud 78 into hopper 35 of a rotary auger type of butter flake and buttermilk separator 36. Separator 36 may be of the jacketed type to enable suitable attempering by the circulation of attempering media through jacket 37 surrounding the auger enclosing cylinder 38. The rotary auger 39 of separator 36 is preferably inclined upwardly from left to right as viewed in the drawings and is provided with radial slots 40 so arranged as to permit the butter flakes to be moved from left to right upon the appropriate rotation of auger 39 by drive motor 41. The radial slots 40 are also so constructed and arranged as to permit a desired quantity of the buttermilk to drain away from the butter flakes by flowing from right to left through the slots 40 and accumulate at the lower left hand end of the chamber 38 from whence the buttermilk is pumped by pump 42 through pipe 43 controlled by valve 83 to the centrifugal buttermilk separator 44. Separator 44 separates the buttermilk into two fractions. One separation fraction containing primarily skimmed buttermilk flows from separator 44 through conduit 45 to a buttermilk drying arrangement, hereinafter to be more fully described. The separation fraction containing the recovered milk fat flows from separator 44 through pipe 46 to surge tank 25 to be blended with the cream and to be returned to the churn 34.

Butter flakes and the controlled quantity of buttermilk as determined by the setting of valve 83 are discharged from separator 36 into an adjustable chute 81 and are thereby conducted to a selected one of a plurality of butter holding and working devices 47. Workers 47 may be of the conventional drum type. The three units 47 are used in rotation to process the butter granules and then to work butter granules into a homogeneous mass of butter having the desired pH and having the desired milk solids and serum content and the desired body and texture as will be hereinafter described. By the use of the three units 47 in rotation, it is possible to use one unit 47 to receive butter granules and buttermilk from chute 81 while another unit 47 is being operated to process the butter and while the third unit 47 is being emptied, thereby making the operation substantially continuous.

The units 47, which may be of the conventional drum type are so constructed and arranged that during the treating and working of the butter granules and the butter such ingredients as salt, etc. may be added if desired.

An important aspect of this invention pertains to the improved method of working the butter in the treating and working units 47 or the churns and butter workers 113 by the use of the improved apparatus to produce a new and improved butter product.

Upon the accumulation of a suitable quantity of butter granules and buttermilk in a treating and working unit 47, the buttermilk is drained from the lower portion of unit 47 through pipe 86 controlled by valve 87 and flows to a multiple passage valve 88 which is also similarly connected by corresponding pipes 86 and corresponding valves 87 to the two remaining trating units 47. The correct setting of valve 88 will connect the desired one of the pipes 86 to the pipe 89, provided with the thermometer 90, to supply the buttermilk drained from unit 47 to the circulating pump 91. Pump 91 forces the buttermilk through pipe 92 to a two way valve 93. Valve 93 may be set to permit the flow of the buttermilk through pipe 94 into and through a buttermilk cooler 95. Cooler 95, may, if desired, be of the conventional plate type attempering device. From the cooler 95 the cooled buttermilk flows through pipe 96, controlled by valve 97 into an elevated atmospheric type surge tank or storage receptacle 98 positioned at an elevation above the elevation of the treating units 47. Tank 98 is provided with a suitably graduated indicator 99 for indicating the exact volume or weight as the case may be of the material stored or present in the receptacle 98. A discharge conduit 100 connected to the bottom of tank 98 and including a valve 101 closely coupled to the bottom of the tank 98, and including a thermometer 102, conducts the cooled buttermilk from tank 98 to a multiple passage valve 103. Valve 103 is connected to three discharge pipes 104. Selective setting of the valve 103 permits the discharge of the cooled buttermilk into a selected pipe 104, each of which pipes 104 is in turn connected at its opposite end to a separate buttermilk sprayer or spray pipe 105. Each of the spray pipes 105 is positioned in the upper portion of one of the treating units 47, and is adapted to spray the chilled buttermilk over the butter granules accumulated in the respective unit 47.

By the appropriate setting or opening of the appropriate valve 87 for the selected unit 47 and the appropriate setting of the valves 88, 93, 97, 101 and 103, and the operation of pump 91, the buttermilk, which, at the time of original accumulation with the butter flakes in unit 47 may be of a temperature of approximately fifty-three to fifty-five degrees Fahrenheit, as indicated by thermometer 90, is circulated through the cooler 95 to be cooled to a temperature of approximately 35 degrees Fahrenheit, as indicated by thermometer 102, and is then returned by way of surge tank 98 and pipe 100, valve 103 and pipe 104 to the spray pipe 105, and sprayed over the accumulated butter granules in the unit 47. Such cooling and circulating of the buttermilk is continued for a period of approximately twenty minutes until the temperature of the buttermilk, as shown by the thermometer 90, indicates that the temperature of the butter granules in the unit 47 have been cooled from the churning or "breaking" temperature of approximately fifty-five degrees Fahrenheit to a working temperature of approximately forty-five to forty-eight degrees Fahrenheit.

After the temperature of the butter granules in unit 47 has thus been lowered to the indicated working temperature, the pump 91 is stopped and valve 87 associated with the particular unit 47 is closed and the butter granules are permitted to age in the cooled buttermilk for a period of approximately one-half hour. After such aging of the butter granules in the chilled buttermilk, the butter granules are worked in the chilled buttermilk at a temperature of approximately forty-eight degrees Fahrenheit for a period of approximately five to ten minutes, during which working operation the chilled butter flakes extract from the chilled buttermilk some of the milk fat remaining in the buttermilk which milk fat was not solidified at the elevated "breaking" temperature thereby improving the exhaustiveness of the churning operation. During the same working operation the chilled butter flakes also extract from the chilled buttermilk a relatively large quantity of milk solids and serums to thereby increase by about fifty percent the milk solids content of the resulting butter, to produce butter having a milk solids content of approximately one and one-half percent instead of the normal one-half to a maximum of one percent milk solids present in butter made by conventional methods.

After the mentioned working of the chilled butter in the chilled buttermilk, the valve 87 associated with the used unit 47 is opened and the valve 101 is closed, and, if desired, a quantity of buttermilk is then pumped into receptacle 98 for blending with starter mixture in such proportions as to produce the desired volume as indicated by indicator 99, for ultimate use in completing the production of the butter in unit 47.

As soon as sufficient buttermilk has been introduced into the tank 98 for blending with the starter mixture, the valve 97 is closed and the valve 93 adjusted to direct the flow of buttermilk being pumped from the unit 47 through pipe 106 into an atmospheric type holding tank 107. From tank 107 the buttermilk is drawn through the pipe 108 through heater 109 into the inlet end of conduit 110. The sections of conduit 110 include the pump 111 and the valve 112. After passing valve 112 the buttermilk is discharged into pipe 43, through which pipe it flows to separator 44 for further processing as will be hereinafter described.

After a large portion of the buttermilk has thus been drained from the unit 47, the valve 87 is again closed and the chilled butter and the remaining small quantity of buttermilk are worked for a period of approximately ten minutes in conventional manner to incorporate into the butter the remaining quantity of buttermilk and to form a homogeneous mass of butter within the unit 47.

After the butter has thus been worked to incorporate the remaining buttermilk, the butter is then tested for moisture content and thereafter the desired quantity of salt, if salt butter is desired, may be added to the butter and the desired quantity of starter material including buttermilk is introduced into unit 47 from tank 98 by opening valve 101 and permitting the starter material to drain by gravity through the pipe 104 and spray pipe 105 into the unit 47. The starter material and salt, if salt has been added, are then worked into the chilled butter in the conventional manner to produce an improved butter having a milk fat content of approximately eight percent, a salt content, if salt was added, of approximately two and one-half percent, a milk solids content of approximately one and one-half percent and a moisture content of approximately sixteen percent. Such improved butter is readily distinguishable from normal butter wherein the milk solids content varies from one-half percent to a maximum of one percent and moisture derived from the conventional washing of the butter granules in the water varies from sixteen and one-half percent to seventeen percent.

From the treating and working units 47 the finished butter may be discharged on to conveyors 82 and conveyed to a suitable packaging and discharge device 48.

Referring again to the skim milk discharged through pipe 24 from separator 22, the pH concentration of which skim milk was suitably adjusted immediately prior to the separation operation, such skim milk is in satisfactory condition for immediate drying without requiring further pH adjustment. The skim milk therefore flows from pipe 24 through a continuous acting pre-heating unit 49 and through pipe 50 to a drying unit 51. Drying unit 51 may be of any of the conventional type milk driers, such as for example roll type driers, spray driers, etc. From the drier unit 51 the dried milk product may be passed to and through passage 52 to a suitable packaging unit 53.

Referring again to the skimmed buttermilk discharged from centrifugal separator 44 through pipe 45, such skimmed buttermilk, having shortly theretofore been adjusted as to pH value while flowing through unit 18, is in satisfactory condition for immediate drying and flows from pipe 45 through the continuously acting pre-heater 54 and pipe 55 to a drying unit 56. Drying unit 56 may be of the same type specified for drying unit 51. The dried buttermilk product is discharged from drying unit 56 through conduit 57 to a suitable packaging unit 58.

Figure 2:
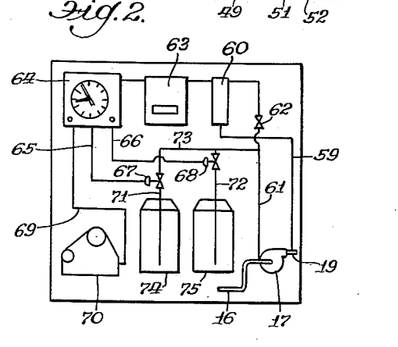
FIGURE 2 is an enlarged diagrammatic illustration of the preferred type of continuously operable hydrogen ion concentration or pH adjustment device comprising one of the units of the system illustrated in FIGURE 1 of the drawings.

The pH or hydrogen ion concentration testing and adjusting unit indicated generally by the numeral 18 is illustrated in more detail in FIGURE 2 of the drawings. A suitable sample of the material being processed i.e. sour milk or sour cream in the described variant of this invention, is continuously withdrawn from the discharge pipe 19 of pump 17 and conducted through pipe 59 to and through the electrode chamber or pH sensing chamber 60. From chamber 60 the test sample is in turn discharged again through pipe 61 to the inlet or suction side 16 of pump 17. Pipe 61 may if desired be equipped with a suitable throttle valve 62 near the electrode chamber 60. The contact of the electrodes in chamber 60 with the test sample of the material being processed produces a difference in potential between the electrodes.

The electrodes in chamber 60 are operatively connected to the amplifier unit 63 which is in turn operatively connected to control unit 64. The difference in potential or signal developed in chamber 60 is amplified in unit 63. The amplified signals developed in chamber 60, as amplified in unit 63, are in turn utilized by control unit 64 to control the flow of air under pressure through unit 64 into either one of the two pipes 65 or 66 to either one of the two bellows actuated valves 67 or 68 respectively. Air under pressure is supplied to controller 64 through pipe 69 from air compressor 70. Valves 67 and 68 are operatively connected in branches 71 and 72 respectively of a pH adjustment material supply pipe 73 which is so connected as to discharge into pipe 61 between the throttle valve 62 and pump 17. The lower free ends of pipes 71 and 72 extend respectively into supply receptacles 74 and 75 for the storage of liquid alkaline and acid pH adjustment media respectively.

In the operation of the pH control and adjustment unit 18, the pH sensing signal or potential difference developed in the electrode chamber 60 is in turn acted upon by the amplifier 63. Controller 64 in turn responds to the amplified signals received from unit 63 whereby to controllably actuate either one of the valves 67 or 68. Upon the opening of either valve 67 or 68 the selected pH adjustment media is drawn from either receptacle 74 or 75, as the case may be, by the suction of the pump 17 and flows through pipes 73 and 61 into the stream of material being processed as such material is about to enter pump 17.

Figure 3:
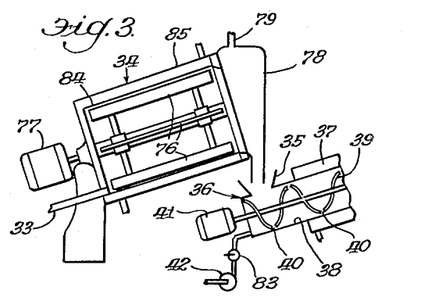
FIGURE 3 is a partial diagrammatic view and a partial vertical sectional view of apparatus usable as a churn for converting the milk fat content of the cream into butter flakes or granules.

Referring to FIGURE 3 of the drawings, it should first be noted that many types of mechanical agitators may be used to churn cream and convert the milk fat content thereof into butter flakes or granules. The illustrated arrangement of churn 34 contemplates an upwardly tilted cylinder 84 having an internal diameter of approximately six inches and a length of approximately sixteen inches. A jacket 85 for the circulation of attempering media surrounds the cylinder 84. A four bladed agitator 76 with the blades extending longitudinally of cylinder 84 and close to but out of contact with cylinder 84 is coaxially mounted within the cylinder 84 and may be driven by motor 77 at a speed of approximately 2800 r.p.m. to efficiently and effectively churn the cream supplied through pipe 33 to the lower end of cylinder 84 and quickly convert at least the major portion of the milk fat content thereof into butter flakes or granules. From the churn 34 the butter flakes and buttermilk are discharged from the upper right hand end of cylinder 84 through shroud 78 to the hopper 35 of the buttermilk separator 36. Shroud 78 is open to the atmosphere at 79 to provide an ample supply of atmospheric air to the interior of churn 34.

Figure 1:
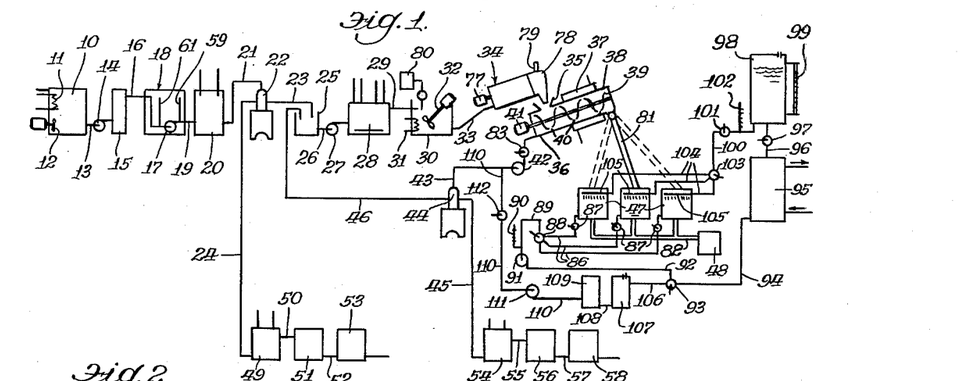
FIGURE 1, is a diagrammatic representation of a system of apparatus suitable for and well adapted for the performance of a variant of this invention. The diagram is in the form of a flow chart depicting the flow of milk and or cream in the illustrated variant of this invention in a continuous method wherein the lacteal fluid is converted into butter, dried skim milk and dried buttermilk.

Although in the flow system of FIGURE 1 there have been included a series of pumps such as pumps 14, 27 and 42, it should be remembered that variations in relative arrangement of the units of the system as previously suggested may be made thereby rendering one or more of the illustrated pumps unnecessary. Similarly, a filter 16 may not be required; the material being processed may have been filtered before introduction into tank 10. The possible interchange of some of the functions of attempering units 20, 28 and 30 has hereinbefore been explained.

One of the aspects of the present invention is that the product being processed, as for example, sour cream, wherein an acid condition may develop due to bacterial action, is continuously tested with respect to hydrogen ion concentration and continuously and uniformly adjusted to a predetermined hydrogen ion concentration desired in the end product by one adjustment, and is then promptly converted into an end product having the predetermined hydrogen ion concentration before the bacteria can again multiply and before the bacterial action can cause a variation in the hydrogen ion concentration, whereby to produce an end product or end products having a minimum bacteria count and a minimum of by-products of the chemical reaction incident to the pH adjustment reaction, and having the predetermined hydrogen ion concentration.

Figure 4:
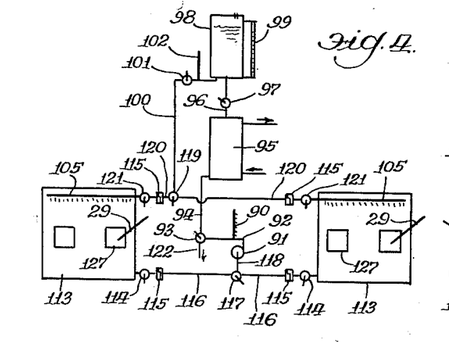
FIGURE 4 is a diagrammatic representation of a modified batch-type butter churn and worker arrangement adapted to be used for the conversion of cream into butter by the improved method and also adapted to be substituted into the system illustrated in FIGURE 1, in place of the butter churn and butter treating and working assembly there illustrated.

The system of apparatus illustrated in FIGURE 4, is adapted particularly for the batch-type operation, using the basic improved method of making butter as described above. The two spaced churns and the butter workers 113 are operatively connected or connectable to a buttermilk cooler 95 and buttermilk surge tank or starter mixture tank 98 in the same general manner as are the treating units 47 of FIGURE 1. In operation, ripened and pasteurized cream to be churned is supplied directly to either or both of the churn and worker units 113 in the conventional manner, or the cream may be supplied to the churns and the workers 113 from pipe 29 of the flow system shown in FIGURE 1. The thirty to forty percent cream at a temperature of approximately forty-eight to fifty degrees Fahrenheit is then churned until the cream "breaks" and the milk fat globules coalesce whereby the butter flakes are formed, during which churning operation the temperature within the churn due to the agitation and due to the crystallization of the milk fat changes from the mentioned cream temperature to a temperature of approximately fifty-three to fifty-five degrees Fahrenheit. To cool the thus formed butter flakes and the buttermilk from the temperature of approximately fifty-five degrees Fahrenheit, the buttermilk cooling and circulating unit is promptly connected to the churn 113.

The churn discharge valve 114 is connected by a quick-coupling joint 115 to pipe 116 which, when valve 114 is opened, conducts the warm buttermilk from the lower portion of churn 113 to the multiple passage valve 117, which valve 117, when properly set, conducts the buttermilk through pipe 118 to the circulating pump 91. Pump 91 forces the buttermilk through pipe 92, which carries thermometer 90, through the properly set multiple passage valve 93, through pipe 94, into and through the cooler 95. In cooler 95 the buttermilk is cooled to a temperature of approximately thirty-five to thirty-eight degrees Fahrenheit. The thus cooled buttermilk is discharged from cooler 95 through pipe 96 controlled by valve 97 into the surge tank 98 from which it is discharged by gravity through pipe 100, controlled by valve 101 and carrying thermometer 102, to the multiple passage valve 119. Valve 119 is operatively connected through pipe 120 by means of the quick coupling unit 115 to the inlet valve 121 carried by the outer end of the buttermilk spray pipe 105. Spray pipe 105 extends into the upper portion of the churn and worker 113, and the cooled buttermilk is sprayed therethrough back onto the butter granules in churn 113. The circulation and cooling of the buttermilk and the cooling of the butter is thus continued until the temperature of the butter has been lowered to a temperature of approximately forty-five to forty-eight degrees Fahrenheit.

When the thus formed butter has reached the desired chilled temperature the valves 93 and 101 are adjusted to accumulate a small quantity of buttermilk in the surge tank 98, whereupon valves 97 and 101 are closed, and the buttermilk in tank 98 is blended with desired quantities of starter materials in the manner hereinbefore mentioned. The chilling of the butter granules requires the circulation of the chilled buttermilk for a period of approximately twenty minutes, whereupon the valves 114 and 121 are closed and the two connections 115 associated with the respective churn 113 are opened and the butter is then aged in the cold buttermilk for a period of approximately one-half hour and thereafter worked in the cold buttermilk at a temperature of approximately forty-eight degrees Fahrenheit for a period of approximately five to ten minutes in the manner and for the purpose hereinbefore described with respect to the corresponding operation regarding the units 47. The two connections 115 for the specific churn 113 are then again connected and the valve 114 opened and the valve 93 adjusted to permit the draining of the buttermilk from the churn 113 through discharge pipe 122 to a suitable point of discharge. Such suitable point of discharge, if the churns 113 are connected into the system of FIGURE 1, in the place of the continuous operating churn and workers as described with respect to that figure, would be to pump the buttermilk into holder 108.

Following the discharge of the chilled buttermilk from churn 113, and the storing of a small quantity of buttermilk in unit 98 and the addition of starter materials if desired as described with respect to the treatment of butter in units 47, and the subsequent brief working of the butter for a period of approximately ten minutes to incorporate the remaining small quantity of buttermilk followed by the testing, salting and adding of starter mixtures and buttermilk when desired is done according to the steps hereinbefore described in connection with the similar treatment of butter in the units 47. The butter is then further worked to incorporate the added materials. Upon the completion of the butter by such additional working in churn 113, the finished butter is removed therefrom in the conventional manner. The appropriate adjustment of valves 117 and 119 enables the selective use of the butter cooling and circulating unit with either one of the two churns and workers 113 of FIGURE 4.

Figure 5:
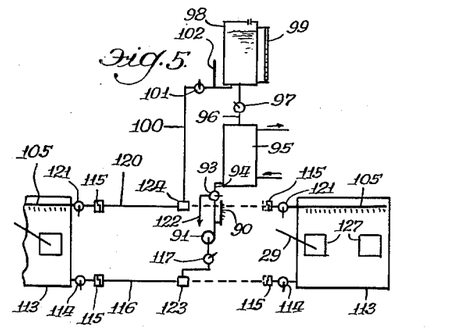
FIGURE 5 is a diagrammatic representation of a modified form of batch-type arrangement illustrated in FIGURE 4 of the drawings.

The modification of a batch-type butter churning system shown in FIGURE 5 differs from that of FIGURE 4 in that swivel junctures 123 and 124 have been substituted for the valves 117 and 119. The swivels 123 and 124 permit the selective use of a single set of pipes 116 and 120 to serve the two churns 113. The swivels 123 and 124 and pipes 116 and 120 could, if desired, be replaced by the use of lengths of a suitable type of flexible tubing.

Figure 6:
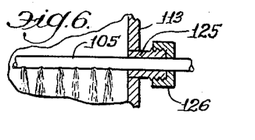
FIGURE 6 is a vertical sectional view illustrating an arrangement for removably supporting the buttermilk spray pipe in the drum head of a churn and butterworker of the type illustrated in FIGURES 4 and 5 of the drawings.

FIGURE 6, illustrates an arrangement for removably supporting the spray pipe 105 by extending pipe 105 into a treating unit 47 or a churn 113 through a close fitting sleeve 125 to which the pipe 105 is temporarily secured by an apertured type cap nut 126, threaded to the outside of the sleeve 125. When the pipe 105 is removed from the unit 47 or the churn 113 the aperture in sleeve 125 may be sealed by the use of a conventional imperforate cap nut.

Figure 7:
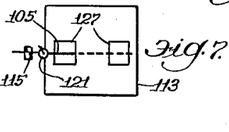
FIGURE 7 is a diagrammatic representation of a modified arrangement for removably introducing the buttermilk spray pipe into the churn and butterworker through the door thereof.

FIGURE 7 illustrates a modified arrangement for introducing the spray pipe 105 into a churn 113 through a door 127 of the churn 113.

It will be apparent that the described apparatus and methods of making butter enable the production of an improved butter product having a greatly increased milk solids content which of necessity also greatly increases the complex fat phospholipid including lecithin content of the improved butter. It is apparent that the increased milk solids content of the improved butter and certain chemical components of such milk solids has an important and favorable bearing on such improved qualities of the butter as flavor, body, spreadability and texture. The well recognized emulsifying and anti-oxidant qualities of lecithin have an important and favorable bearing on the uniformity, spreadability and keeping qualities of the improved butter. The improved methods of producing butter avoid entirely the conventional contacting of the butter with such foreign material as water commonly used in the washing of the butter and also thus avoids the resulting introduction of water into the finished butter. The chilling of the buttermilk and the chilling and working of the chilled butter in the chilled buttermilk, enables the much more extensive working of the chilled butter without damage to the recognized qualities of good butter, and also enables the extraction by and the absorption by the chilled butter of the greatly increased milk solids content derived directly in their natural state from the buttermilk in which the butter was churned.

Butter shall be understood to mean the food product usually known as butter and which is made from milk or cream or both.

Buttermilk shall be understood to mean the product that remains when milk fat is removed from milk or cream in a process of churning.

Butter granules and/or butter flakes shall be understood to mean the particles of butter having a minimum diameter of approximately one-eighth of an inch and formed of coalesced milk fat globules in a process of churning.

Milk fat globules shall be understood to mean the minute particles of milk fat as present in, for example, freshly drawn cow's milk and varying in diameter within the range of approximately 1 to 22 microns, and having an average diameter of approximately 3 microns.

Mass of butter shall be understood to mean an agglomeration of a large number of butter granules or butter flakes into a homogeneous mass of butter.

From the foregoing description of this invention and from the accompanying drawings, it will be apparent that this invention realizes the introductorily enumerated objectives respecting the improved butter product and the improved apparatus and methods for churning the improved butter product, and the drying of products, such, as for example, skimmed milk and buttermilk. It will similarly be apparent that the invention possesses the hereinbefore listed advantages and provides new novel and useful improvements in a butter product, methods for producing the improved butter product, and apparatus for practicing the improved methods.

Having thus described and illustrated the preferred embodiments of this invention, the invention is not to be interpreted as being restricted to the specifically illustrated and described embodiments as set forth in the drawings and as hereinbefore described, except insofar as is necessitated by the appended claims and the disclosures of the prior art.

The invention is hereby claimed as follows:

1. A method of producing butter comprising the steps of, continuously agitating a continuously flowing stream of a standardized dairy product containing milk fat in the dispersed phase to produce butter granules and buttermilk, continuously removing the butter granules and the buttermilk from the place where the butter granules were formed and introducing the butter granules and a predetermined portion of the buttermilk into a butter working place, circulating the buttermilk over and through the thus removed butter grandules, cooling the buttermilk while being circulated and continuing such circulating and cooling of the buttermilk until the temperature of the butter grandules has been reduced from the butter breaking temperature to a satisfactory butter working temperature, discontinuing the circulation and cooling of the buttermilk and quiescently aging the chilled butter granules in the chilled buttermilk, working the chilled butter granules in the chilled buttermilk to produce a butter mass, draining substantially all of the buttermilk from the worked butter mass, and further working the butter mass to incorporate thereinto any buttermilk remaining with the butter mass.

2. A method of producing butter which includes the steps of, continuously churning a standardized dairy product containing milk fat in the dispersed phase to simultaneously form butter granules and a buttermilk solution having a temperature of approximately fifty-five degrees Fahrenheit, continuously removing the butter granules and to buttermilk from the place of churning and depositing the butter granules and a predetermined portion of the buttermilk in a butterworking place, withdrawing quantities of said buttermilk from said butter granules and cooling the withdrawn buttermilk to a temperature of approximately forty degrees Fahrenheit, returning the cooled buttermilk to the butter granules and circulating the thus cooled buttermilk over and through the butter granules to cool the butter granules to a working temperature of approximately forty-eight degrees Fahrenheit, permitting the thus cooled butter granules to rest quiescently in the cooled buttermilk for a period of approximately thirty minutes, working the cooled butter granules in the cooled buttermilk for a period of approximately ten minutes to form a mass of butter, removing substantially all of the cooled buttermilk from the mass of worked butter, and further working the cooled and worked butter mass to incorporate into the butter any remaining free buttermilk.

3. A continuous method of producing butter from cream comprising the steps of, continuously introducing a stream of cream to a churning station, churning the cream to produce butter granules and buttermilk having a temperature of approximately fifty-five degrees Fahrenheit, continuously removing butter granules and buttermilk from the churning station and conveying the butter granules and a portion of the buttermilk to a butter worker station, withdrawing some of the buttermilk from the butterworker station and cooling the buttermilk to a temperature of approximately forty degrees Fahrenheit and circulating the cooled buttermilk over and through the butter granules for a period of approximately twenty minutes to reduce the temperature of the butter granules to a satisfactory working temperature of approximately forty-five to forty-eight degrees Fahrenheit, discontinuing the circulation of the buttermilk and quiescently aging the butter granules in the chilled buttermilk for a period of approximately one-half hour, working the chilled butter granules in the chilled buttermilk for a period of approximately ten minutes to extract additional milk fat and additional milk solids from the buttermilk to form a mass of butter having a substantially greater milk solids content compared to the milk solids content of conventionally produced butter, withdrawing substantially all of the buttermilk from the mass of butter, further working the mass of butter to incorporate thereinto any remaining buttermilk at the butterworker station, adding butter starter material to the worked mass of butter, and still further working the mass of butter to produce a homogeneous mass of butter.

4. A continuous method of producing butter comprising the steps of, continuously withdrawing from a source of supply of sour milk product containing milk fat in the dispersed phase and containing acid formed by bacterial action in the milk product, attempering the withdrawn milk product to a temperature of approximately forty-five to forty-eight degrees Fahrenheit and continuously flowing the thus attempered milk product to a butter churning station for the churning of the milk fat content of the milk product, sensing the pH value of the thus withdrawn and flowing milk product and adjusting the magnitude of the pH thereof to a desired pH magnitude substantially immediately preceding the introduction of the flowing milk product to said butter churning station, continuously agglomerating the milk fat content of such milk product to form butter flakes and buttermilk at said butter churning station while the pH value remains substantially as adjusted and before the acid forming bacteria in the milk product can again multiply appreciably and before the bacterial action in such milk product can substantially increase the acid content of such milk product and conveying the butter flakes and buttermilk to a butterworker station while the butter flakes and buttermilk have a temperature approximately fifty-five degrees Fahrenheit, separating quantities of buttermilk from the butter flakes at the butterworker station, circulating the thus separated buttermilk produced in the agglomerating operation over and through the butter flakes, cooling the buttermilk while being circulated to a temperature of approximately forty degrees Fahrenheit and continuing such circulation and cooling of the buttermilk until the temperature of the butter flakes has been reduced from a temperature of approximately fifty-five degrees Fahrenheit to a temperature of approximately forty-five to forty-eight degrees Fahrenheit, discontinuing the circulation of the buttermilk and quiescently aging the chilled butter flakes in the chilled buttermilk for a period of approximately one-half hour, working the chilled butter flakes in the chilled buttermilk for a period of approximately ten minutes to extract additional milk fat and milk solids from the chilled buttermilk and to produce a mass of worked butter at the butterworker station, draining substantially all of the chilled buttermilk from the worked mass of butter, and further working the mass of butter to incorporate thereinto any remaining buttermilk to produce a homogeneous mass of butter having a predetermined pH value and having a substantially higher milk solids content compared to the milk solids content of conventionally produced butter and having a desired texture and body and flavor and spreadability, conveying the worked butter from the butterworker station to a packaging station, and packaging the thus conveyed butter.

5. Apparatus for continuously processing a milk product, comprising, in combination, a source of continuous supply of a milk product to be processed and containing milk fat in the dispersed phase, butter churning means for continuously receiving the milk product and for continuously converting the milk fat content of the milk product into butter granules and for producing buttermilk, continuously operable butterworker means for continuously receiving butter granules and buttermilk from said churn means for working said butter granules into a homogeneous mass of butter, and fluid discharging and circulating and cooling means for discharging fluid from said butterworker means and for cooling fluid and circulating cooled fluid over and through the butter granules while the butter granules are confined within said butterworker means.

6. Apparatus for continuously producing butter, comprising, in combination, a source of supply of a liquid milk product containing milk fat in the dispersed phase, churn means for continuously receiving liquid milk product and for continuously agglomerating milk fat in the milk product to produce butter granules and buttermilk, continuously operable transfer means for continuously transferring liquid milk product from said source of supply to said churn means, butterworker means for receiving butter granules and buttermilk from said churn means, circulating means for circulating buttermilk from said butterworker means back into said butterworker means, and cooler means for cooling the buttermilk while it is circulating through said circulating means.

7. Apparatus according to claim 6, having buttermilk sprayer means for receiving the cooled buttermilk from said circulating means and spraying the thus cooled buttermilk back into the upper portion of said butterworker means.

8. Apparatus according to claim 7, wherein said circulating means includes a buttermilk cooling means and a storage receptacle connected in series in the order mentioned, said storage receptacle being positioned at an elevation greater than the elevation of said buttermilk sprayer means.

9. Apparatus according to claim 8, having a pH sensing and adjusting means in the continuously operable transfer means for continuously sensing and adjusting the pH of said liquid milk product to a desired pH value.

10. Apparatus according to claim 9, having separating means in said transfer means for separating said milk product into a skim milk fraction and a fraction containing a substantially increased milk fat content, said separating means being operatively connected in said transfer means intermediate said pH sensing and adjusting means and said churn means, and means for receiving and drying said skim milk fraction.

11. Apparatus according to claim 10, having means for discharging buttermilk from said butterworker means, and means for receiving and drying the thus discharged buttermilk.

12. Apparatus according to claim 11, having a plurality of butterworker means each of which is operatively connected to said circulating means for the circulation of buttermilk from a selected worker means back to the upper portion of the selected worker means, and valve means in said circulating means whereby to limit the flow of buttermilk being circulated from and back to a selected worker means.

13. Apparatus for processing a milk product comprising, in combination, a source of supply of a milk product to be processed, pH sensing and adjusting means for adjusting the pH value of the milk product to a desired pH value, separator means for separating the milk product into a skim milk fraction and a cream fraction, drying means for receiving and drying the skim milk fraction, butter churn means for converting milk fat content of the cream fraction of separation into butter granules and for producing buttermilk, butterworker means for receiving butter granules and buttermilk from said churn means, circulating means for circulating buttermilk from said butterworker means and returning the circulated buttermilk to said butterworker means, and cooling means for cooling the buttermilk while it is being circulated through said circulating means.

14. Apparatus according to claim 13, having means for withdrawing the buttermilk from said butterworker means upon the completion of the circulation of the buttermilk and deliver the thus withdrawn buttermilk to a drying station, and drying means for receiving and drying the buttermilk.

15. A method of producing an oleaginous product made from material containing fat which may be agglomerated into granules, comprising the steps of, processing the material to form fat granules therein, cooling the fat granules in the remainder of the material in which the granules were formed, and agitating and combining the cooled granules in the cooled remainder of the material to form a mass of combined granules, and then separating the mass of combined granules from the remainder of the material.

16. A method of producing butter and buttermilk from lacteal material, comprising the steps of, processing the lacteal material to produce butter granules and free buttermilk, cooling the butter granules and the buttermilk to a satisfactory butter working temperature, and working the cooled butter granules in the cooled buttermilk to form a mass of butter from the butter granules, and separating the mass of butter from the remaining buttermilk.

17. A method of producing butter according to claim 16, wherein the lacteal material comprises cream which is tempered to a processing temperature of approximately forty-five to forty-eight degrees Fahrenheit prior to the commencement of the processing step to produce the butter granules.

18. A method according to claim 17, wherein the butter granules and the buttermilk attain a satisfactory butter breaking temperature of approximately fifty-three to fifty-five degrees Fahrenheit upon the completion of the formation of the butter granules and are then cooled to a satisfactory butter working temperature of approximately forty-five to forty-eight degrees Fahrenheit.

19. A method according to claim 18, wherein the cooled butter granules are quiescently rested in the cooled buttermilk after they have been cooled to said satisfactory butter working temperature.

20. A method according to claim 19, wherein the cooled and quiescently rested butter granules are worked in the cooled buttermilk to form a mass of butter, whereafter substantially all of the free buttermilk is withdrawn from the mass of butter.

21. A method according to claim 20, wherein the mass of butter is further worked to uniformly incorporate thereinto any remaining buttermilk.

22. A method of producing butter from cream, comprising the steps of, adjusting the magnitude of the pH of the cream to a desired magnitude, churning the cream to produce butter granules and free buttermilk, cooling the butter granules and the thus churned buttermilk, aging the cooled butter granules in the cooled buttermilk, working the cooled butter granules in the cooled buttermilk to form a mass of butter, draining substantially all of the free buttermilk from the mass of butter, and further working the butter to uniformly incorporate any remaining buttermilk into the butter.

23. A method of producing butter, comprising the steps of, agitating a dairy product containing milk fat in the dispersed phase to produce butter granules and free buttermilk, circulating the thus churned buttermilk over and through the butter granules, cooling the buttermilk while being thus circulated and continuing such circulating and cooling of the buttermilk until the temperature of the butter granules has been reduced from the butter breaking temperature to a satisfactory butter working temperature, discontinuing the circulation and cooling of the buttermilk and then quiescently aging the chilled butter granules in the chilled buttermilk, working the chilled butter granules in the chilled buttermilk to produce a butter mass, draining substantially all of the buttermilk from the worked butter mass, and further working the butter mass to incorporate thereinto any buttermilk remaining with the butter mass.

24. A method of producing butter from cream having a butterfat content of approximately thirty percent to forty percent, comprising the steps of, tempering the cream to a churning temperature of approximately forty-eight to fifty degrees Fahrenheit, churning the cream to form butter granules and free buttermilk having a temperature of approximately fifty-three to fifty-five degrees Fahrenheit, withdrawing the thus churned buttermilk and cooling the buttermilk to a temperature of approximately thirty-five to thirty-eight degrees Fahrenheit, spraying the thus cooled buttermilk over and into the accumulation of butter granules and the remainder of the buttermilk, continuing such cooling and spraying of buttermilk for a period of approximately twenty minutes until the temperature of the butter granules has been reduced to a temperature of approximately forty-five to forty-eight degrees Fahrenheit, quiescently aging the thus cooled butter granules in the thus cooled buttermilk for a period of approximately thirty minutes, working the cooled and aged butter granules in the cooled buttermilk for a period of approximately five minutes to ten minutes to extract additional milk solids and butterfat from the buttermilk and to form a mass of butter, draining a substantial portion of the buttermilk from the mass of butter, further working the mass of butter for a period of approximately ten minutes to uniformly incorporate the remaining portion of the buttermilk into the mass of butter, testing the butter for butterfat content, adding to the mass of butter desired quantities of the buttermilk in which the butter was churned, and further working the mass of butter and the added buttermilk to uniformly incorporate the added buttermilk into the butter, whereby to produce butter having a substantially higher milk solids content as compared to the milk solids content of butter produced by conventional cream churning methods and having improved characteristics of texture and spreadability.

25. A method of producing butter, comprising the steps of, supplying a batch of cream containing approximately thirty to forty percent milk fat in the dispersed phase and having a temperature of approximately forty-five to forty-eight degrees Fahrenheit, processing the batch of cream to produce a batch of butter granules suspended in buttermilk and having a temperature of approximately fifty-three to fifty-five degrees Fahrenheit, cooling the buttermilk and the butter granules to a temperature of approximately forty-five to forty-eight degrees Fahrenheit while the butter granules continue in suspension in the buttermilk and while circulating the buttermilk over and through the butter granules for a period of approximately twenty minutes, quiescently aging the cooled butter granules in the cooled buttermilk for a period of approximately thirty minutes, working the thus cooled butter granules in the cooled buttermilk for a period of approximately ten minutes to form a mass of butter having a temperature of approximately forty-five to forty-eight degrees Fahrenheit, removing substantially all of the buttermilk from the mass of worked butter, and finally working the mass of butter for a period of approximately ten minutes to uniformly incorporate thereinto any remaining free buttermilk.

26. A method according to claim 25, wherein immediately preceding the final working of the mass of butter the butter is tested for milk fat and moisture content, adding desired standardizing ingredients including buttermilk to the mass of butter to be incorporated thereinto during said final working operation, whereby to produce a butter product having a milk fat content of approximately eighty percent and a content of milk solids of one and one-fourth to one and one-half percent derived directly from the milk product from which the butter was churned and in the natural arrangement and state in which the milk solids were present in such milk product and having a moisture content derived substantially entirely from the milk product from which the butter was churned.

27. A method of producing butter, comprising the steps of, receiving from a source of supply a batch of milk product containing milk fat in the dispersed phase and having a pH magnitude different than that desired in the butter and containing bacteria capable of forming acid in the milk product, sensing the pH value of the thus received milk product and adjusting the magnitude of the pH thereof to a desired pH magnitude substantially immediately before the milk product is churned, attempering the received batch of milk product to a temperature of approximately forty-five to forty-eight degrees Fahrenheit, churning the batch of milk product to agglomerate the milk fat content thereof to form butter granules and buttermilk while the pH magnitude of the milk product remains substantially as adjusted, circulating buttermilk from the lower portion of the accumulation of butter granules and buttermilk and cooling the circulating buttermilk and reintroducing the cooled buttermilk into and over the upper portion of the accumulation of butter granules and buttermilk, continuing such circulating and cooling of the buttermilk until the temperature of the butter granules has been reduced from the temperature at which the formation of the butter granules was completed to a satisfactory butter working temperature, quiescently resting the cooled butter granules in the cooled buttermilk, working the cooled butter granules in the cooled buttermilk to form a mass of butter, withdrawing substantially all of the cooled buttermilk from the mass of butter, and further working the mass of worked butter to incorporate thereinto any remaining portions of buttermilk.

28. A method of producing butter, comprising the steps of, supplying a batch of tempered cream containing milk fat in the dispersed phase, agitating the batch of tempered cream to produce a batch of a mixture of butter granules and buttermilk, withdrawing a portion of the buttermilk from the accumulated mixture of buttermilk and butter granules, cooling the thus withdrawn buttermilk, spraying the cooled buttermilk over the accumulated butter granules and the remainder of the buttermilk, concurrently withdrawing additional buttermilk from the accumulated mixture of buttermilk and butter granules and cooling such additional buttermilk and spraying such additional cooled buttermilk over the accumulated butter granules and the remainder of the buttermilk, continuing the withdrawing and cooling and spraying of the buttermilk until the temperature of the butter granules has been reduced from the temperature at which the formation of the butter granules was completed to a satisfactory butter working temperature, discontinuing the withdrawing and cooling and spraying of the buttermilk and quiescently aging the cooled butter granules in the cooled buttermilk, working the cooled and aged butter granules in the cooled buttermilk to produce a mass of butter, withdrawing substantially all of the buttermilk from the mass of butter, and further working the mass of butter to incorporate thereinto any buttermilk remaining with the mass of butter.

29. A butter producing system, comprising, in combination, churn and butterworker means, buttermilk cooling means, and circulating means for receiving buttermilk from said churn and butterworker means and passing such buttermilk through said cooling means and returning the buttermilk to said churn and butterworker means.

30. A system for producing butter comprising, in combination, a combined churn and butterworker unit, buttermilk cooling means, and circulating means for circulating buttermilk from the lower portion of said churn and butterworker unit through said cooling means and returning the cooled buttermilk to the upper portion of said churn and butterworker unit.

31. A system for producing butter, comprising, in combination, a combined churn and butterworker, buttermilk cooling means, buttermilk spraying means, and circulating means for circulating buttermilk from the lower portion of said churn and butterworker through said cooling means to said spraying means for spraying cooled buttermilk back into the upper portion of said churn and butterworker.

32. A system according to claim 31, having a storage receptacle in said circulating means intermediate said cooling means and said spraying means, said storage receptable being positioned at an elevation greater than the elevation of the upper portion of said churn and butterworker.

33. A system for producing butter, comprising, in combination, a combined churn and butterworker unit, cooling means for cooling a flowing stream of buttermilk, spray means adapted to spray buttermilk into said churn and butterworker unit, and circulating means for withdrawing buttermilk from said churn and butterworker unit and circulating the thus withdrawn buttermilk through said cooling means and returning the cooled buttermilk into said churn and butterworker unit through said spray means.

34. A system for producing butter, comprising, in combination, a plurality of combined churn and butterworker units, buttermilk cooling means, and circulating means for circulating buttermilk from the lower portion of a selected combined churn and butterworker unit through said cooling means and returning the cooled buttermilk to the upper portion of the selected combined churn and butterworker unit, and selectively adjustable valve means for operatively connecting said circulating means to the selected one of said combined churn and butterworker units.

35. A system for producing butter, comprising, in combination, a plurality of combined churn and butterworker units adapted to produce butter flakes and buttermilk, buttermilk cooling means, and circulating means for circulating buttermilk from the lower portion of a selected one of said churn and butterworker units through said cooling means and returning the cooled buttermilk to the upper portion of the selected one of said churn and butterworker units, said circulating means having inlet and outlet ends for easy operative connection with the selected one of said churn and butterworker units, and swivel means in said circulating means whereby said inlet and outlet ends of said circulating means may be swiveled into position for easy operative connection with the selected one of said churn and butterworker units.

36. A system for producing butter, comprising, in combination, a source of supply of milk product having a pH varying from that desired in the butter, pH sensing and adjusting means, a combined churn and butterworker unit for churning the pH adjusted milk product to produce butter granules and buttermilk having the desired pH magnitude, buttermilk cooling means, storage receptacle means, spray means for spraying buttermilk into the upper portion of said churn and butterworker unit, and circulating means for withdrawing buttermilk from the lower portion of said churn and butterworker unit and circulating said buttermilk in order through said cooler means and said storage receptacle means and said spray means back into the upper portion of said churn and butterworker unit.

37. A system for producing butter, comprising, in combination, a combined churn and butterworker unit for producing butter flakes and buttermilk, buttermilk cooling means, a graduated supply receptacle for butter standardizing ingredients positioned at an elevation above the elevation of said churn and butterworker unit, and circulating means for circulating buttermilk from the lower portion of said churn and butterworker unit through said cooling means and through said supply receptacle back into the upper portion of said churn and butterworker unit.

38. A system according to claim 37, having valve means in said circulating means immediately adjacent to and on either side of said supply receptacle, whereby upon the satisfactory adjustment of said valve means a desired and predetermined quantity of material may be stored in said graduated supply receptacle for subsequent flowing by gravity into the upper portion of said churn and butterworker unit upon the necessary adjustment of said valve means.

39. A system for producing butter, comprising, in combination, a combined churn and butterworker unit for producing butter granules and buttermilk, buttermilk cooling means, buttermilk spraying means within said churn and butterworker unit, a connection for said spraying means extending through a wall of said churn and butterworker unit, a buttermilk discharge connection in a wall of said churn and butterworker unit, circulating means for circulating buttermilk from said discharge connection through said cooling means and returning the cooled buttermilk to said spraying means, selectively adjustable valve means for operatively controlling the flow of buttermilk through said circulating means, and quickly connectable and quickly disconnectable juncture means for operatively connecting said connection for said spray means and said buttermilk discharge connection to the outlet and the inlet ends respectively of said circulating means.

40. A system for producing butter, comprising, in combination, a combined churn and butterworker including a chamber for churning butter flakes and for working butter, means for introducing liquid into said churn and butterworker, cooling means for cooling a flowing stream of liquid, liquid spray means positioned in the upper portion of said churn and butterworker, and circulating means for circulating liquid from the lower portion of said churn and butterworker through said cooling means and through said spray means, whereby to withdraw liquid from the lower portion of said churn and butterworker and cool such withdrawn liquid and spray the cooled liquid back into the upper portion of said churn and butterworker.

References Cited in the file of this patent

UNITED STATES PATENTS

| | | |
|---|---|---|
| 1,906,713 | Parsons | May 2, 1933 |
| 2,200,514 | Mitchel et al. | May 14, 1940 |
| 2,299,440 | Vander Meulen | Oct. 20, 1942 |
| 2,406,819 | Farrell | Sept. 3, 1946 |
| 2,526,292 | Staaf | Oct. 17, 1950 |
| 2,536,297 | Lundal et al. | Jan. 2, 1951 |
| 2,569,203 | Stigen | Sept. 25, 1951 |
| 2,605,185 | Zachariassen et al. | July 29, 1952 |
| 2,638,419 | Robichaux | May 12, 1953 |